United States Patent [19]
Olcutt

[11] 3,885,073
[45] May 20, 1975

[54] PRE-STRESSED PYROLYTIC GRAPHITE-REFRACTORY CARBIDE MICROCOMPOSITES

[75] Inventor: Eugene L. Olcutt, Falls Church, Va.

[73] Assignee: Atlantic Research Corporation, Alexandria, Va.

[22] Filed: Apr. 12, 1973

[21] Appl. No.: 350,550

Related U.S. Application Data

[63] Continuation-in-part of Ser. No. 65,899, Aug. 21, 1970, Pat. No. 3,738,906.

[52] U.S. Cl. ............... 428/112; 428/114; 428/295; 428/368; 428/902
[51] Int. Cl. ............................................ B32b 5/12
[58] Field of Search ............ 161/168, 169, 206, 60, 161/162; 117/DIG. 11, 106 C, 169 A, 46 CG

[56] References Cited
UNITED STATES PATENTS

| | | | |
|---|---|---|---|
| 3,007,805 | 11/1961 | Cline | 106/44 |
| 3,317,356 | 5/1967 | Clendinning | 117/106 C |
| 3,379,555 | 4/1968 | Hough | 117/106 C |
| 3,391,016 | 7/1968 | McCrary et al. | 117/106 C |
| 3,464,843 | 9/1969 | Basche | 117/106 C |
| 3,629,049 | 12/1971 | Olcott | 117/46 CG |
| 3,653,851 | 4/1972 | Gruber | 117/106 C |
| 3,676,293 | 7/1972 | Gruber | 161/206 |
| 3,677,795 | 7/1972 | Bokros et al. | 117/46 CG |
| 3,685,059 | 8/1972 | Bokros et al. | 117/46 CG |
| 3,707,006 | 12/1972 | Bokros et al. | 117/46 CG |
| 3,713,865 | 1/1973 | Leeds | 117/46 CG |
| 3,738,906 | 6/1973 | Olcott | 161/57 |

Primary Examiner—William J. Van Balen
Assistant Examiner—William R. Dixon, Jr.
Attorney, Agent, or Firm—Martha L. Ross

[57] ABSTRACT

Pre-stressed pyrolytic graphite microcomposite comprising pyrolytic graphite crystallites containing embedded therein codeposited crystals of refractory carbide selected from the group consisting of silicon, zirconium, hafnium, titanium, tantalum, and neobium, and mixtures thereof, in which the concentration of the codeposited crystals relative to the concentration of pyrolytic graphite adjacent at least one outer surface of the microcomposite is less than the concentration of said codeposited crystals interiorly of said surface and methods for making same as disclosed. SiC, ZrC, and HfC are preferred. Particularly preferred are microcomposites comprising pyrolytic graphite crystallites containing embedded therein codeposited aciculae of crystalline silicon carbide, the longitudinal axes of the aciculae being aligned in the $c$-direction relative to the $a$–$b$ plane of the associated pyrolytic graphite crystallite.

A rigid pre-stressed composite pyrolytic graphite article and method of making same comprising a matrix of the pyrolytic graphite microcomposite of (1) containing embedded therein at least one reinforcing refractory strand layer comprising a plurality of unidirectional, substantially parallel, laterally spaced, individual, continuous refractory strands are also disclosed. The microcomposite matrix is nucleated from each of the individual refractory strands and interconnected to form a continuous matrix phase surrounding and interconnecting the individual strands comprising the embedded strand layer.

27 Claims, 7 Drawing Figures

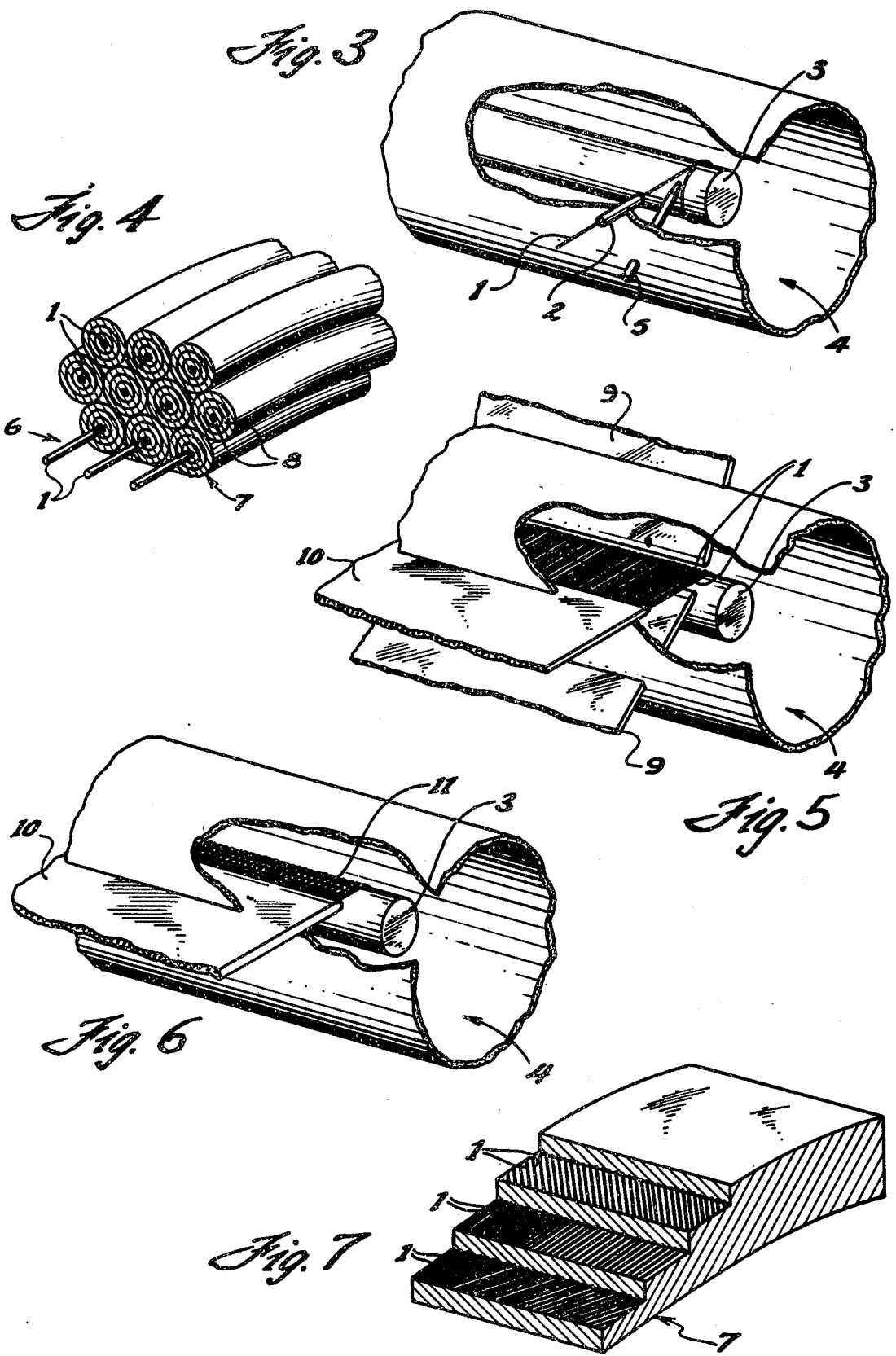

PRE-STRESSED PYROLYTIC GRAPHITE-REFRACTORY CARBIDE MICROCOMPOSITES

CROSS REFERENCES TO RELATED APPLICATIONS

This application is a continuation-in-part of application Ser. No. 65,899 filed Aug. 21, 1970, now U.S. Pat. No. 3,738,906.

BACKGROUND OF THE INVENTION

The embedding within the pyrolytic graphite crystallite structure of codeposited crystals of refractory carbide, selected from the group consisting of silicon, zirconium, hafnium, titanium, tantalum, and niobium, preferably SiC, ZrC, and HfC, substantially reduces the anisotropy of the pyrolytic graphite and its tendency to delaminate by interrupting the laminar layers in the $a$–$b$ plane, thereby substantially eliminating many of the impediments to its practical use as a structural element. Strength and thermal conductivity in the thickness or $c$-direction are substantially increased and thermal expansion is reduced. Additionally the embedded refractory carbides substantially increase oxidation resistance since, unlike carbon which oxidizes to a gas, the refractory carbides oxidize to solid or liquid oxides which form a protective coating.

In copending U.S. application Ser. No. 65,899, filed Aug. 21, 1970, of which the present application is a continuation-in-part and which is hereby incorporated by reference, there are disclosed novel, rigid, microcomposites of pyrolytic graphite containing embedded therein codeposited crystalline aciculae of SiC. The longitudinal axes of the crystalline aciculae are aligned in the $c$-direction, namely perpendicular to the $a$–$b$ plane of the associated pyrolytic graphite crystallites at the point of embedment. It is also disclosed in application Ser. No. 65,899 that, in some applications, it may be desirable to use a microcomposite of graded relative pyrolytic graphite and SiC composition. For example, the outermost portion of the microcomposite can have a higher SiC content to minimize oxidative surface erosion. Such graded variations in the relative amounts of the codeposited pyrolytic graphite and SiC can readily be achieved by varying respective flow rates of the methyl trichlorosilane and hydrocarbon gas and/or other processing variables in the codeposition process.

It has now been discovered that microcomposites comprising crystallite layers of pyrolytic graphite containing embedded codeposited crystals of a refractory carbide selected from the group consisting of silicon, zirconium, hafnium, titanium, tantalum, and niobium carbide, wherein the concentration of the refractory carbide crystals relative to the pyrolytic graphite is lower adjacent at least one surface than interiorly at a distance from said surface, provides important improvements in structural performance for certain applications, such as those requiring the application of bending or tensile stresses to the material. It is known that by incorporating residual compressive stresses in brittle, ceramic-type materials, such as certain types of glass, cracking and fissuring can be substantially reduced.

Microcomposites of the invention which have lower concentrations of the refractory carbide crystals adjacent at least one surface are compressionally pre-stressed because of the decreasing thermal coefficient of expansion of the microcomposite material with decreasing concentration of the refractory carbide crystals relative to the pyrolytic graphite. Such microcomposite materials can be produced only at high elevated temperatures. Upon cooling, the outer layer shrinks less than the interior layers containing a higher concentration of the refractory carbide and is thereby placed in a state of compression by the inner microcomposite composition which contracts more, resulting in residual compressional pre-stressing.

Application Ser. No. 65,899 additionally discloses composite materials comprising a microcomposite matrix of the pyrolytic graphite-acicular SiC aforedescribed containing embedded therein at least one reinforcing refractory strand layer comprising a plurality of unidirectional and substantially parallel, laterally spaced, individual, continuous refractory strands. The microcomposite matrix is nucleated from each of the individual refractory strands and interconnected to form a continuous matrix phase. By conforming the microcomposite pyrolytic graphite crystallite layers containing the embedded, codeposited crystalline aciculae of SiC to embedded strand surfaces instead of to the surface of a conventional base substrate, anisotropy and delamination tendencies are further reduced and oxidation resistance improved.

Grading of the embedding microcomposite matrix so that it contains a reduced concentration of codeposited refractory carbide adjacent at least one outer surface of the composite article compressionally pre-stresses the article as aforedescribed, thereby substantially reducing tendency to crack or fissure.

SUMMARY OF THE INVENTION

Broadly, the invention relates to a rigid pyrolytic graphite microcomposite comprising a pyrolytic graphite crystallite structure containing embedded therein codeposited crystals of refractory carbide selected from the group consisting of silicon, zirconium, hafnium, titanium, tantalum, and niobium, in which the concentration of the codeposited crystals relative to the concentration of pyrolytic graphite adjacent at least one outer surface of the microcomposite is less than the concentration of said codeposited crystals interiorly of said surface. SiC, ZrC, and HfC are preferred. Particularly preferred are microcomposites comprising a pyrolytic graphite crystallite structure containing embedded therein codeposited aciculae of crystalline SiC, the longitudinal axes of the aciculae being aligned in the $c$-direction relative to the $a$–$b$ plane of the associated pyrolytic graphite crystallite at the point of embedment. The layer of microcomposite material containing the reduced concentration of refractory carbide adjacent the outer surface has a lower thermal coefficient of expansion than interior layers. Upon cooling of the microcomposite after its formation, compressional stresses are produced in the body of the microcomposite since the outer layer shrinks less than the interior layers and is thereby placed in a state of compression by the inner, more greatly contracted microcomposite composition.

The codeposition of the crystals of the specified refractory carbides so that they are embedded in and interrupt the laminar layers of pyrolytic graphite crystallite reduces anisotropy and the tendency of the layers to delaminate. The codeposition of crystalline aciculae of SiC as aforedescribed provides a very substantial dimension in the thickness or c-direction which is particularly effective in reducing anisotropy and delaminating tendency. This results in substantially increased strength in the thickness dimension and improvement in other properties, such as thermal expansion and thermal conductivity. Since SiC and the other refractory carbides are considerably harder than pyrolytic graphite, their presence in the microcomposites also improves erosion resistance. They also improve oxidation resistance since they are more resistant than graphite to oxidation and in addition produce refractory oxides which form a protective coating on the microcomposite.

The invention additionally comprises a rigid, prestressed pyrolytic graphite composite article comprising a matrix of the aforedescribed pyrolytic graphite-refractory carbide microcomposite containing embedded therein at least one and preferably a plurality of reinforcing refractory strand layers, each strand layer comprising a plurality of unidirectional, substantially parallel, laterally spaced, individual, continuous refractory strands. The microcomposite matrix is nucleated from each of the individual refractory strands and interconnected to form a continuous matrix phase surrounding and interconnecting the embedded strand layer or layers. The concentration of the codeposited refractory carbide crystals relative to the concentration of pyrolytic graphite in the microcomposite matrix adjacent at least one outer surface of the composite article is less than the concentration of the codeposited crystals in the matrix interiorly of said surface.

Nucleation and growth of the pyrolytic graphite-refractory carbide microcomposite from the contoured surfaces of the plurality of refractory strands further reduce and interrupt the laminar character of the pyrolytic graphite and thereby further reduce anisotropy and delamination tendency. The embedded continuous strands also act as strength reinforcements and provide a means for producing a composite having desired controlled and reliably reproducible characteristics.

The strands can be made of any suitable refractory material, such as carbon; refractory metals and metal alloys, carbides, borides, nitrides, and oxides. The continuous refractory strand can be in the form of an individual strand or a plurality of spaced, substantially unidirectionally oriented, individual strands which can be simultaneously positioned as a strand layer, or a woven material such as a cloth or tape. The term "refractory strand" as employed herein includes an individual filament or a multiplicity of fibers which have been spun or otherwise incorporated to form the continuous strand.

The microcomposite pyrolytic graphite-refractory carbide material can be made by pyrolyzing a gaseous mixture of hydrocarbon gas and decomposible Si, Zr, Hf, Ti, Ta, or Nb carbide-forming compound, preferably a halogen compound, onto a heated substrate, until deposition of a microcomposite of the desired thickness is obtained, and in the course of said deposition, maintaining the relative concentration of the Si, Zr, Hf, Ti, Ta, or Nb carbide-forming compound to the concentration of the hydrocarbon lower during deposition adjacent at least one outer surface of the microcomposite than said relative concentration during deposition interiorly of said surface.

The rigid, reinforced, composite pyrolytic graphite-refractory carbide articles can be made by progressively positioning a continuous, individual refractory filament or strand onto a shaped form and simultaneously pyrolyzing a gaseous mixture of the aforedescribed carbide-forming gas and hydrocarbon onto the filament or strand at about the point of positioning contact to nucleate pyrolytic graphite and refractory carbide from the strand, progressively positioning additional strand laterally spaced from previously positioned strand and, as the additional strand is positioned, simultaneously pyrolyzing the mixture of carbide-forming gas and hydrocarbon thereon at about the point of positioning contact and onto the codeposited pyrolytic graphite and refractory carbide nucleated from previously positioned strand. The pyrolysis temperature is generally about 2800° to 4000°F, preferably about 3200° to 3800°F. The relative concentration of the carbide-forming compound to hydrocarbon is maintained at a lower level during deposition adjacent at least one outer surface of the composite article than its relative concentration during deposition interiorly of said surface.

DRAWINGS

FIG. 3 is a schematic illustration of apparatus for practicing an embodiment of this invention.

FIG. 4 is a schematic illustration of a rigid strand-reinforced pyrolytic graphite-refractory carbide composite according to this invention.

FIGS. 5 and 6 are schematic representations of modified apparatus suitable for use in preparing the strand-reinforced composites.

FIG. 7 schematically illustrates an alternative arrangement of reinforcing strands.

DETAILED DESCRIPTION OF THE INVENTION

The codeposited refractory carbide, as aforementioned, can be silicon, zirconium, hafnium, tantalum, titanium or niobium carbides, preferably silicon, zirconium, or hafnium carbide. Of these silicon carbide in the form of crystalline aciculae is particularly preferred.

The amount of codeposited refractory carbide should be at lease 5 percent, preferably at least about 10 percent, by volume of the total microcomposite material. Depending upon the desired properties for a particular application, the percent can be as high as 90 or even 95. In general, the preferred range is about 10 to 50 volume percent, with the pyrolytic graphite making up the remainder.

Figure 1:
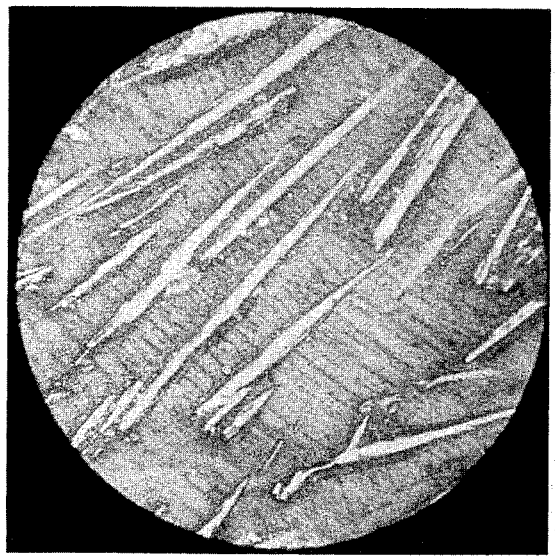
FIG. 1 is a photomicrograph at a magnification of 150 of a cross-section of a sample of pyrolytic graphite-SiC microcomposite of the invention.
Figure 2:
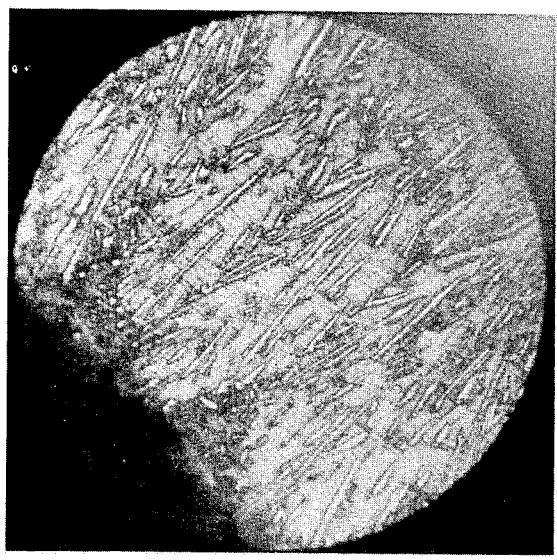
FIG. 2 is a photomicrograph of the same section at a magnification of 600.

The photomicrographs of FIGS. 1 and 2 at 150X and 600X magnification respectively, clearly show the SiC, a large proportion of which is in the form of needle-like aciculae oriented perpendicularly to the $a$–$b$ plane of the associated crystallites forming the codeposited laminar layers of pyrolytic graphite, which forms an embedding matrix. The volume percent of SiC in the photographed sample is about 20 percent. The length to width ratio of the aciculae is generally at least about 2:1 and preferably is at least about 4:1.

The other refractory carbides, such as zirconium carbide and hafnium carbide, generally codeposit in the form of small crystals dispersed among the pyrolytic graphite crystallites. Although not as effective in these respects as the c-direction oriented acicular crystals of SiC, they substantially reduce anisotropy of the pyrolytic graphite and its tendency to delaminate.

The microcomposites can be made by vapor phase pyrolysis of a mixture of a hydrocarbon gas and an appropriate gaseous carbide-forming metal compound, such as Zr, Hf, Ta, Ti, or Co halide, onto a heated substrate, generally at a temperature of about 2800°–4000°F. The acicular SiC microcomposite can be made by vapor phase pyrolysis of a mixture of methyl trichlorosilane at a temperature preferably of about 3200°–3800°F. An inert diluent gas, such as argon, nitrogen, helium, hydrogen, and mixtures thereof, is generally desirable, with some or all of the gas used to aspirate the decomposible, refractory-carbide producing compound such as methyl trichlorosilane, if it is normally non-gaseous at ambient temperature. Mixtures of hydrogen with argon, helium, or nitrogen have been found particularly effective in obtaining good acicular crystalline SiC formation. The process can be carried out in a conventional furnace with related metering and injection equipment at reduced or atmospheric pressures. Deposition is continued until a microcomposite material of the desired thickness is obtained.

The relative flow rates of the methyl trichlorosilane or metal halide, such as zirconium chloride or hafnium chloride, and hydrocarbon gas vary with the desired microcomposite composition. In general, the silane or metal halide may be introduced at a weight percent flow rate of about 5 to 75 percent, preferably about 15 to 50 percent and the hydrocarbon gas at a weight percent flow rate of about 25 to 95 percent, preferably about 15 to 50 percent.

The hydrocarbon gas can be any of those generally employed in producing pyrolytic graphite by vapor phase deposition, such as the lower alkanes, e.g., methane, ethane, and propane; ethylene; acetylene; and mixtures thereof. Methane is preferred.

As aforedescribed, compressional pre-stressing of the microcomposite material can be obtained by depositing adjacent to at least one of its outer surfaces a layer of the pyrolytic graphite-refractory carbide codeposit having a lower concentration of carbide relative to pyrolytic graphite than the carbide concentration interior to the outer layer. Upon cooling of the formed microcomposite material, the outer, lower-carbide-concentration layer contracts less than the interior, higher-carbide-concentration layers, with resulting compressional stress on the outer layer, which is normally more vulnerable to cracking or fissuring under tensile or bending stresses. The compressional pre-stressing counteracts this tendency.

The lesser contraction of the outer layer is due to the decrease in thermal coefficients of expansion which accompanies reduced relative concentrations of the codeposited refractory carbide to pyrolytic graphite. For example, a microcomposite comprising 25 vol. percent SiC and 75 percent pyrolytic graphite has a thermal expansion coefficient of $2.6 \times 10^{-6}$ inches/inch/°F at 3500°F whereas a microcomposite comprising 7 vol. percent SiC and 93 percent pyrolytic graphite has a coefficient of $2.0 \times 10^{-6}$ inches/inch/°F.

The relative interior and outer concentrations of the refractory carbide can be varied as desired so long as the concentration at at least one outer surface of the microcomposite material is less than the concentration interiorly of the codeposit layer adjacent the surface. The concentration can be either gradually or abruptly reduced from the interior to the outer layer as required for a particular application. The desired change in relative carbide concentration can be obtained by decreasing the concentration of the carbide-forming gas relative to hydrocarbon in the furnace mixture in the course of deposition.

In the case where the microcomposite material is formed as an adherent coating on an appropriate substrate, it may be sufficient to reduce the refractory carbide concentration only on the outer surface. In the case of a free-standing article, it may be desirable to reduce the carbide concentration adjacent the two opposite surfaces in the thickness dimension. This can be accomplished by starting the microcomposite deposition process withh lower relative concentration of carbide-producing component, increasing it as the interior layers are deposited, and then decreasing it during deposition of the outermost layer.

The pyrolytic graphite-refractory carbide microcomposites can be reinforced to increase strength and further reduce anisotropy of the pyrolytic graphite component by embedding at least one layer of a plurality of unidirectional and substantially parallel, laterally spaced, individual, continuous, refractory strands in the microcomposite by nucleating the codeposited pyrolytic graphite and refractory carbide from each of the strands to form a continuous interconnecting matrix surrounding and interconnecting the individual strands.

The refractory strand can be single or multifilament and can be made from a refractory material such as carbon in any suitable form, including, for example, pyrolyzed rayon and pyrolytic graphite; refractory metals, such as boron, tungsten, and molybdenum, and alloys thereof; refractory carbide, such as silicon, boron, tantalum, zirconium, hafnium, titanium, and niobium carbide, and mixtures thereof; refractory borides, such as zirconium, hafnium, titanium, and tantalum boride, and mixtures thereof; refractory nitrides, such as silicon and boron nitride and mixtures thereof; refractory oxides, such as aluminum, silicon, zirconium, and hafnium oxides, and mixtures thereof; refractory-coated refractory metal filaments, such as SiC- or boron-coated tungsten; and the like. Carbon, because of its relatively low cost and general availability, is a preferred strand material. Other refractory materials, above listed, are advantageous because of their generally higher resistance to oxidation. Many of these refractory materials also have as high or higher strength to weight ratios as carbon and, therefore, can contribute greater actual strength to the composite. Silicon carbide, boron, and aluminum oxide are preferred species.

The strand-reinforced microcomposites can be made by progressively positioning a continuous, individual refractory strand onto a shaped form and simultaneously pyrolyzing the mixture of pyrolysis gases onto the strand at about the point of positioning contact to nucleate pyrolytic graphite and codeposited refractory carbide from the strand, progressively positioning additional strand laterally spaced from previously positioned strand and, as the additional strand is positioned, simultaneously pyrolyzing the gases thereon at about the point of positioning contact and onto the codeposited pyrolytic graphite and refractory carbide nucleated from previously positioned strand.

The method can be practiced with apparatus such as that schematically illustrated in FIG. 3. As shown therein, a continuous, individual refractory strand, as for example carbon strand, 1, is fed through a guide tube 2, and connected to a mandrel 3, disposed in chamber 4. To prevent oxidation of the carbonaceous gas, atmospheric oxygen is removed and continuously excluded from the chamber by evacuation and/or purging with inert gases such as helium or nitrogen. The strand is heated to and maintained at a temperature sufficient to pyrolyze the carbide-producing gas, such as methyl trichlorosilane, and hydrocarbon gases by induction, radiant, or resistance heating means, not shown. The mandrel is rotated and moved longitudinally relative to the strand guide tube 2, by means not shown. In this manner, spaced turns of strand are progressively positioned on the mandrel. As the strand is wound, the mixture of pyrolysis gases is fed through tube 5, to impinge upon the strand at about the point of winding contact. Pyrolysis occurs and a pyrolytic graphite-refractory carbide, such as pyrolytic graphite-SiC microcomposite matrix, is nucleated from the heated strand substrate. As winding continues, the microcomposite is simultaneously deposited onto the strand being wound and onto the matrix deposited on previously wound strands. Thus, the strands are not only individually enveloped in a microcomposite matrix but are interconnected and bonded to each other by the matrix. The winding is continued to produce a composite article such as schematically illustrated in FIG. 4. As shown, the article comprises one or more spaced, reinforcing strand layers 6, each of which comprises a plurality of spaced strands 1, disposed in and interconnected by microcomposite matrix 7, composed of graphite crystallite layers 8 containing embedded codeposited crystals of the refractory carbide, such as perpendicularly oriented, codeposited aciculae of SiC.

As shown, the crystallite layers of the pyrolytic graphite in the microcomposite matrix are oriented in conformity to surfaces of the strands and are, therefore, aligned around the strands and in the direction of strand orientation, thereby maximizing strength of the pyrolytic graphite component in that direction. Furthermore, the embedded strands significantly reinforce the microcomposite-strand composite in the direction of strand orientation.

Since the orientation of the pyrolytic graphite crystallite layers conforms to the strand surfaces rather than the base or mandrel substrate surface of the composite, the pyrolytic graphite component of the microcomposite does not have the continuous laminar structure characteristic of conventional pyrolytic graphite. This, together with the embedded codeposited refractory carbide crystals, such as SiC aciculae, further tends to prevent propagation of cracks and delaminations. Composite strength in the thickness direction is also further significantly improved by the increased degree of crystallite layer alignment in that direction. In addition, the marked disparity in thermal expansion in the $a-b$ and $c$ directions characteristic of conventional pyrolytic graphite is further reduced.

The strands also prevent delamination failures by restricting the thickness of laminar pyrolytic graphite component growth units nucleated from these strands. It is known that growth units less than 0.05 inches thick are less subject to delamination. Since, in the composition of this invention, the thickness of laminar pyrolytic graphite component units is generally about one-half the distance between the strands, preferred unit size is obtained by spacing the strands less than 0.1 inch of each other.

The process for composite fabrication can be practiced with individual strands, as in the embodiment described, or with multi-strand structures, such as a plurality of laterally spaced, unidirectionally oriented individual strands, or with woven cloths or tapes comprising strands oriented in both warp and woof directions. When using multi-strand structures to prepare a composite, it is preferred simultaneously to impinge the reactive gas mixture on both sides of the strand structure as it is progressively laid down to ensure that the gas penetrates between the strands to effect the highest degree of lateral bonding. This can be accomplished by apparatus such as schematically illustrated in FIG. 5, wherein gas injector channels 9, feed gas into contact with spaced strands 1, or by apparatus as shown in FIG. 6, wherein woven refractory cloth 11 and gas are both fed through guide channel 10.

When the method is practiced with woven fabrics, little matrix bond is obtained between strands where warp and woof intercross since it is difficult for the reaction gas mixture to penetrate between the touching strands. It is, therefore, preferred that all strands in each reinforcing strand layer in the composite be substantially unidirectionally oriented. Such orientation eliminates weaknesses which result from the absence of a matrix bond at points of strand-to-strand contact. In composites having multiple reinforcing strand layers, the direction of strand orientation can be varied in different reinforcing layers as shown, for example, in FIG. 7. Thus, composites having desired directional strength characteristics can readily be prepared.

This invention can, of course, be practiced by positioning strand on a variety of shaped forms to produce articles having the desired configuration. The strand can be progressively positioned on the shaped form by any desired technique. However, winding is preferred for reasons of simplicity. It will be understood from the foregoing discussion that the term "progressively" positioning connotes a gradual laying down of strand to continuously and progressively increase the area of strand contact with the shaped form rather than effecting overall lateral strand contact as by "stacking." This permits matrix formation between strands as they are positioned and eliminates the necessity of forcing the feed gas mixture between prepositioned strands.

When the invention is practiced with strands, such as carbon yarns, which comprise a multiplicity of fibers which have been spun or otherwise incorporated to form the continuous strand, the pyrolytic graphite-refractory carbide microcomposite may, in some instances, be deposited on fibers or fuzz protruding from the strand rather than directly on the base strand. Therefore, in order to obtain optimum lateral bonding of strands by the matrix, it may be desirable to minimize such protrusions as, for example, by mechanically removing them with a scraper blade as the matrix is built up or by utilizing strands precoated with pyrolytic graphite to provide a smooth surface.

As in the case of the microcomposite materials aforedescribed, the strand-reinforced composite article can be compressionally pre-stressed by reducing the concentration of the codeposited crystals of refractory carbide in the layer of matrix adjacent at least one outer surface of the articles. Since such articles are generally free-standing, it may be desirable to reduce the refractory carbide concentration adjacent both surfaces in the thickness dimension.

Although this invention has been described with reference to illustrative embodiments thereof, it will be apparent to those skilled in the art that the principles of this invention can be embodied in other forms but within the scope of the claims.

I claim:

1. A pre-stressed pyrolytic graphite microcomposite comprising crystallite layers of pyrolytic graphite containing embedded therein codeposited crystals of a refractory carbide selected from the group consisting of silicon, zirconium, hafnium, titanium, tantalum, and niobium carbide, and mixtures thereof, in which the concentration of the codeposited refractory carbide crystals relative to the concentration of pyrolytic graphite adjacent at least one surface of the microcomposite is less than the concentration of said codeposited crystals interiorly of said surface, the concentration of the codeposited crystals in the total microcomposite being in the range of about 5 to 95 percent by volume.

2. The microcomposite of claim 1 wherein the refractory carbide is silicon carbide, zirconium carbide, or hafnium carbide, or mixtures thereof.

3. The microcomposite of claim 2 wherein the refractory carbide is silicon carbide in the form of crystalline aciculae, the longitudinal axes of said aciculae being aligned in the $c$-direction relative to the $a–b$ plane of the associated pyrolytic graphite crystallites at the point of embedment.

4. The microcomposite of claim 1 wherein the concentration of the refractory carbide crystals adjacent two opposite surfaces of the microcomposite is less than the concentration of said codeposited crystals interiorly of said surfaces.

5. The microcomposite of claim 2 wherein the concentration of the refractory carbide crystals adjacent two opposite surfaces of the microcomposite is less than the concentration of said codeposited crystals interiorly of said surfaces.

6. The microcomposite of claim 3 wherein the concentration of the refractory carbide crystals adjacent two opposite surfaces of the microcomposite is less than the concentration of said codeposited crystals interiorly of said surfaces.

7. A pre-stressed pyrolytic graphite article comprising a matrix of the pyrolytic graphite-refractory carbide microcomposite of claim 1 containing embedded therein at least one reinforcing strand layer, said strand layer comprising a plurality of unidirectional and substantially parallel, laterally spaced, individual, continuous refractory strands, said matrix being nucleated from each of said strands and interconnected to form a continuous matrix phase surrounding and interconnecting each of said individual strands comprising said embedded at least one strand layer.

8. The article of claim 7 wherein the refractory carbide is silicon carbide, zirconium carbide, or hafnium carbide, or mixtures thereof.

9. The article of claim 8 wherein the refractory carbide is silicon carbide in the form of crystalline aciculae, the longitudinal axes of said aciculae being aligned in the $c$-direction relative to the $a–b$ plane of the associated pyrolytic graphite crystallites at the point of embedment.

10. The article of claim 7 wherein the concentration of the refractory carbide crystals adjacent two opposite surfaces of the article is less than the concentration of said codeposited crystals interiorly of said surfaces.

11. The article of claim 8 wherein the concentration of the refractory carbide crystals adjacent two opposite surfaces of the article is less than the concentration of said codeposited crystals interiorly of said surfaces.

12. The article of claim 9 wherein the concentration of the refractory carbide crystals adjacent two opposite surfaces of the article is less than the concentration of said codeposited crystals interiorly of said surfaces.

13. The article of claim 8 wherein said at least one reinforcing refractory strand layer comprises a plurality of layers.

14. The article of claim 9 wherein said at least one reinforcing refractory strand layer comprises a plurality of layers.

15. The article of claim 10 wherein said at least one reinforcing refractory strand layer comprises a plurality of layers.

16. The article of claim 11 wherein said at least one reinforcing refractory strand layer comprises a plurality of layers.

17. The article of claim 12 wherein said at least one reinforcing refractory strand layer comprises a plurality of layers.

18. The microcomposite of claim 1 wherein the refractory carbide comprises about 10 to 50 percent by volume of said microcomposite.

19. The microcomposite of claim 2 wherein the refractory carbide comprises about 10 to 50 percent by volume of said microcomposite.

20. The microcomposite of claim 3 wherein the refractory carbide comprises about 10 to 50 percent by volume of said microcomposite.

21. The microcomposite of claim 4 wherein the refractory carbide comprises about 10 to 50 percent by volume of said microcomposite.

22. The microcomposite of claim 5 wherein the refractory carbide comprises about 10 to 50 percent by volume of said microcomposite.

23. The microcomposite of claim 6 wherein the refractory carbide comprises about 10 to 50 percent by volume of said microcomposite.

24. The article of claim 7 wherein the refractory carbide comprises about 10 to 50 percent by volume of said microcomposite.

25. The article of claim 8 wherein the refractory carbide comprises about 10 to 50 percent by volume of said microcomposite.

26. The article of claim 9 wherein the refractory carbide comprises about 10 to 50 percent by volume of said microcomposite.

27. The article of claim 10 wherein the refractory carbide comprises about 10 to 50 percent by volume of said microcomposite.

* * * * *